US009247181B2

(12) United States Patent
Nakama

(10) Patent No.: US 9,247,181 B2
(45) Date of Patent: Jan. 26, 2016

(54) METHOD FOR DISPLAYING AN ELECTRONIC PROGRAM GUIDE INCLUDING A CONTENT CHANNEL ACCORDING TO USER'S PREFERENCE, AND DEVICE THEREFOR

(75) Inventor: Motoki Nakama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 837 days.

(21) Appl. No.: 12/474,536

(22) Filed: May 29, 2009

(65) Prior Publication Data

US 2009/0300681 A1  Dec. 3, 2009

(30) Foreign Application Priority Data

Jun. 2, 2008  (JP) .................... 2008-145144

(51) Int. Cl.
*G06F 3/00* (2006.01)
*G06F 13/00* (2006.01)
*H04N 5/445* (2011.01)
*H04N 21/8405* (2011.01)
*H04N 21/431* (2011.01)
*H04N 21/482* (2011.01)
*H04N 21/422* (2011.01)
*H04N 21/475* (2011.01)

(52) U.S. Cl.
CPC ....... *H04N 5/44543* (2013.01); *H04N 21/4314* (2013.01); *H04N 21/4821* (2013.01); *H04N 21/8405* (2013.01); *H04N 21/42204* (2013.01); *H04N 21/4755* (2013.01)

(58) Field of Classification Search
CPC .......... H04N 21/4826; H04N 21/4828; H04N 21/4755; H04N 21/44543; H04N 21/4821

USPC ................. 725/37, 44–47; 348/563
See application file for complete search history.

(56) References Cited

U.S. PATENT DOCUMENTS

| 6,216,264 | B1* | 4/2001 | Maze et al. ............... 725/53 |
| 6,973,663 | B1* | 12/2005 | Brown et al. ............... 725/39 |
| 7,096,483 | B2* | 8/2006 | Johnson ............... 725/46 |
| 7,213,256 | B1* | 5/2007 | Kikinis ............... 725/53 |
| 8,427,455 | B2* | 4/2013 | Matsuda ............... 345/204 |
| 2005/0047752 | A1* | 3/2005 | Wood et al. ............... 386/83 |
| 2005/0102696 | A1* | 5/2005 | Westberg ............... 725/46 |

FOREIGN PATENT DOCUMENTS

| JP | 2000-295558 A | 10/2000 |
| JP | 2007-174267 A | 7/2007 |
| WO | 2005/027512 A1 | 3/2005 |
| WO | 2007/094168 A1 | 8/2007 |

* cited by examiner

*Primary Examiner* — Hunter B Lonsberry
*Assistant Examiner* — Patrick A Ryan
(74) *Attorney, Agent, or Firm* — Canon U.S.A., Inc. IP Division

(57) ABSTRACT

A device for displaying an electronic program guide includes a program guide display unit configured to display an electronic program guide in which a program channel including scheduled broadcast television program entries and a content channel including content entries stored in a storage device are arranged parallel to each other, a determination unit configured to determine a program entry selected by a user from the displayed electronic program guide, and a changing unit configured to change the content channel in the displayed electronic program guide based on the selected program entry.

4 Claims, 8 Drawing Sheets

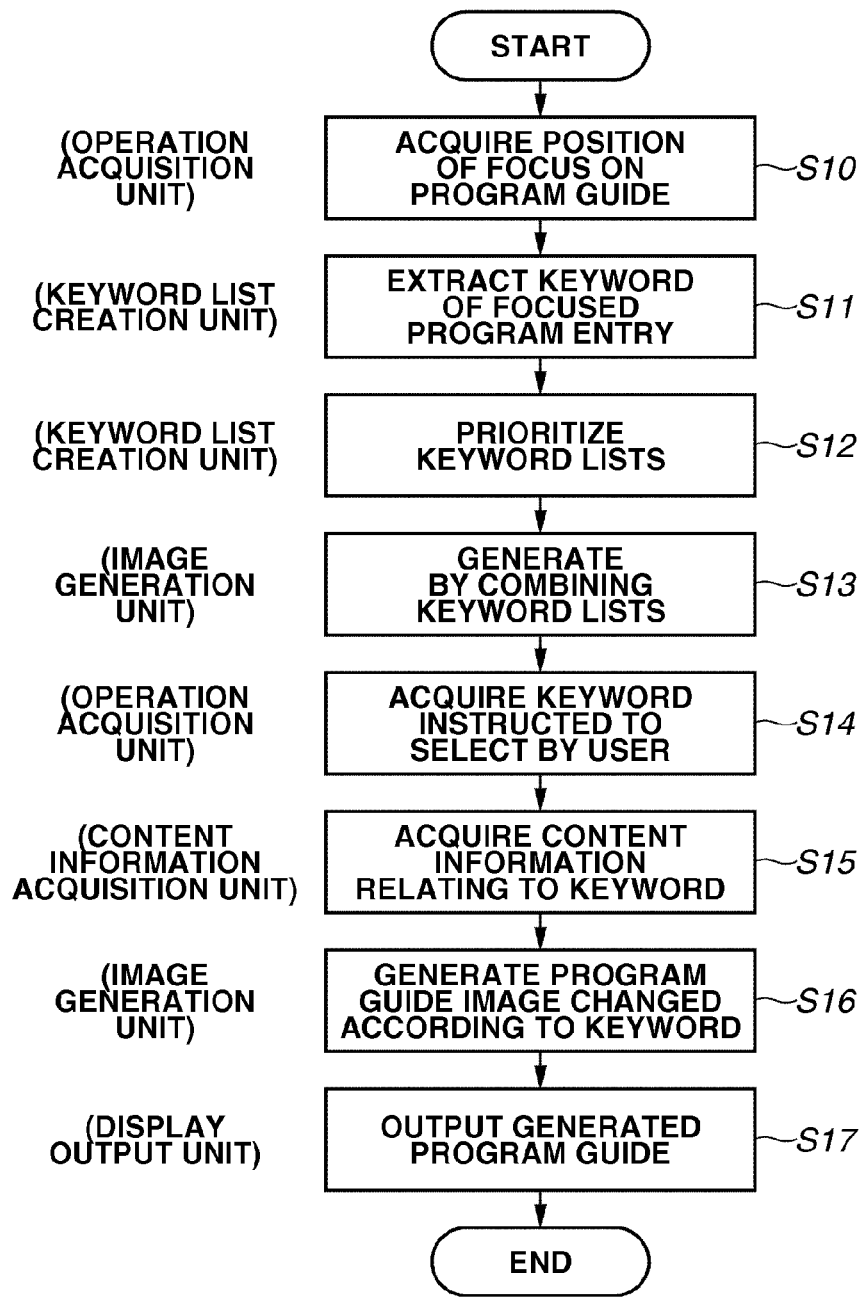

METHOD FOR DISPLAYING AN ELECTRONIC PROGRAM GUIDE INCLUDING A CONTENT CHANNEL ACCORDING TO USER'S PREFERENCE, AND DEVICE THEREFOR

BACKGROUND OF THE INVENTION

1. Field of the Invention

The present invention relates to a method for creating and displaying an electronic program guide usable for both scheduled broadcast television (TV) programs and stored contents, and a device therefor.

2. Description of the Related Art

A technique for displaying a broadcast program channel and a content channel on a screen by combining contents accumulated in a hard disk recorder or a storage device connected to a network with an electronic program guide of a TV broadcast, is discussed, for example, in Japanese Patent Application Laid-Open No. 2000-295558. In the technique discussed in Japanese Patent Application Laid-Open No. 2000-295558, a content channel (private channel) including recorded programs and a broadcast program channel are displayed on the same screen as an electronic program guide. Then, users can select programs from the electronic program guide, and thus can view these programs.

However, in the conventional technique described above, contents and the display position of a content channel in the electronic program guide are automatically determined. Therefore, a user cannot change the content channel. For this reason, a content channel reflecting an intention of a user cannot be generated.

SUMMARY OF THE INVENTION

The present invention is directed to providing a dynamically changeable content channel and displaying an electronic program guide including the content channel according to a user's preference.

According to an aspect of the present invention, a display method for an electronic program guide includes displaying an electronic program guide in which a program channel in which program entries to be broadcast are arranged and a content channel in which content entries stored in a storage device are arranged, are arranged parallel to each other, determining a program entry selected by a user from the electronic program guide to be displayed, and changing the content channel in the electronic program guide to be displayed, based on the selected program entry.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the instruction, illustrate exemplary embodiments, features, and aspects of the invention and, together with the description, serve to explain the principles of the invention.

FIG. 6 is a flowchart illustrating an example of processing operations for generating an electronic program guide image.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Hereinafter, exemplary embodiments according to the present invention will be described in detail with reference to the accompanying drawings.

Figure 1:
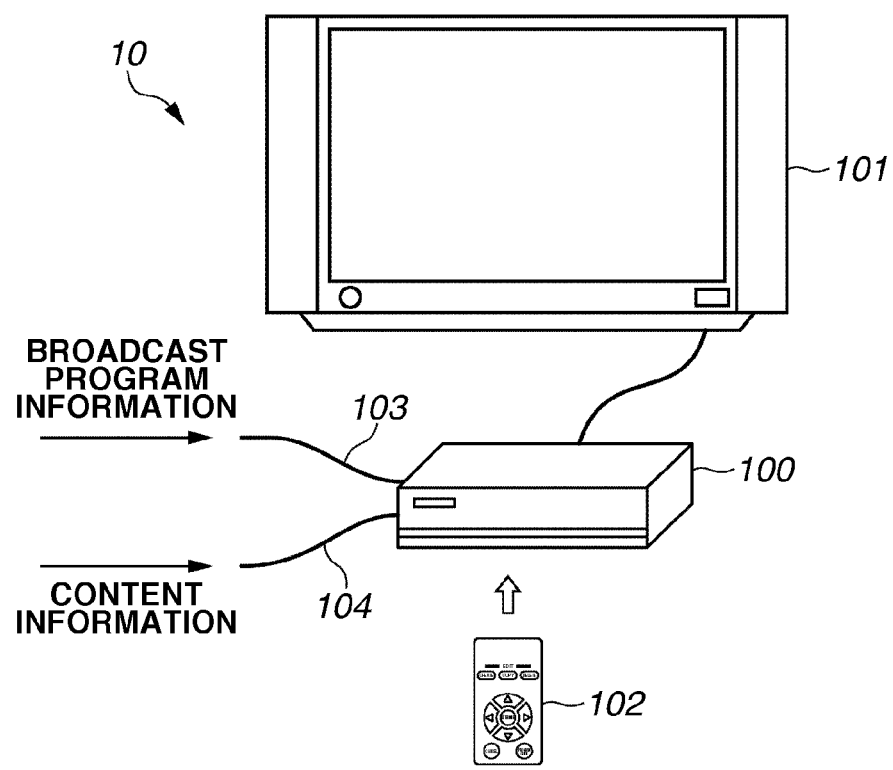
FIG. 1 illustrates an example configuration of a program guide display system.

FIG. 1 illustrates an example configuration of a program guide display system according to an exemplary embodiment of the present invention. A program guide display system 10 of the present invention includes a program processing device 100, a display device 101, and an operation input device 102.

The program processing device 100 performs processing for displaying television broadcast programs and various contents on the display device 101. Video and audio data of broadcast programs and information about the broadcast programs (program information) is input to the program processing device 100 via line 103. The program processing device 100 can record (store) the input video data of the broadcast programs or the like on a memory provided in the program processing device 100, and can output them to the display device 101 after decode processing or the like is performed. A television broadcast line or a network line (Internet) can be used as the line 103, as long as it can receive video, audio and program information of broadcast programs.

Further, contents and information about the contents (content information) accumulated in a storage medium (not illustrated) are input to the program processing device 100 via a line 104. The program processing device 100 can output the input contents to the display device 101 after decoding the contents. A signal line from a recording device such as a hard disk recorder or a network line from a recording device connected to a network can be used as the line 104, as long as it can transmit contents and content information of broadcast programs.

The display device 101 (e.g., liquid crystal display) displays video and contents of broadcast programs and an electronic program guide described below. The operation input device 102 is a remote controller that allows a user to remotely instruct the program processing device 100 to display the electronic program guide.

Figure 2:
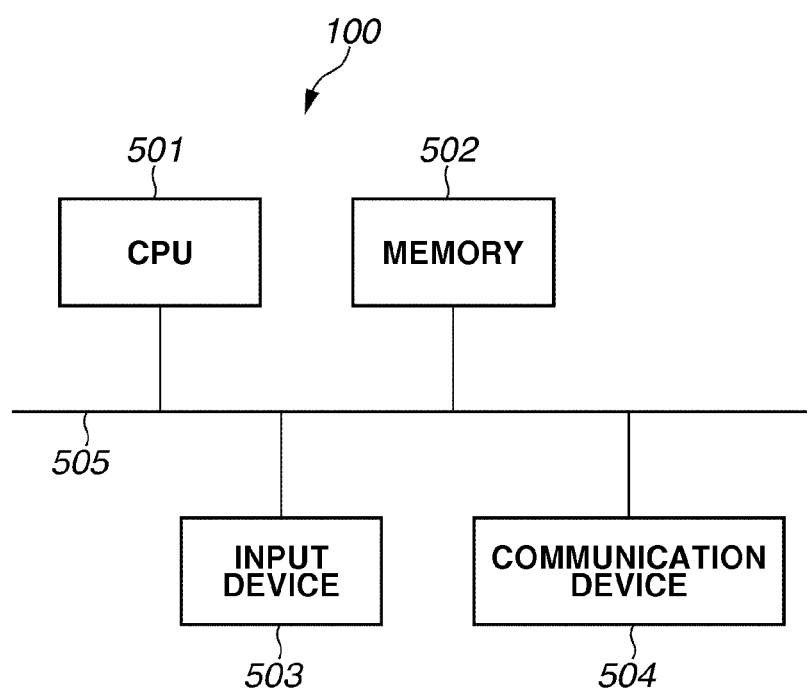
FIG. 2 is a block diagram illustrating an example hardware configuration of a program processing device.

Next, a configuration of the program processing device 100 will be described with reference to FIG. 2. FIG. 2 is a block diagram illustrating an example hardware configuration of the program processing device.

The program processing device 100 includes a central processing unit (CPU) 501, a memory 502, an input device 503, and a communication device 504. The CPU 501 controls the entire program processing device 100. The memory 502 stores a program for realizing a functional configuration of the program processing device 100 described below, program information, and content information. Alternatively, the memory 502 may store thereon videos of broadcast programs, audios of broadcast programs and contents. The input device 503 is configured to allow a user to directly provide instructions to the program processing device 100, even if the user does not use the operation input device 102 described above.

The communication device 504 includes, for example, a network interface, an infrared ray interface, and a display interface. The communication device 504 transmits and receives videos, audios, program information, contents and content information of broadcast programs. Further, the communication device 504 receives instruction information from the operation input device 102 and transmits image data of an electronic program guide to the display device 110. The program processing device 100 may be provided with a rendering circuit (not illustrated) or the like. Respective components of the program processing device 100 are connected with each other via a bus 505.

Figure 3:
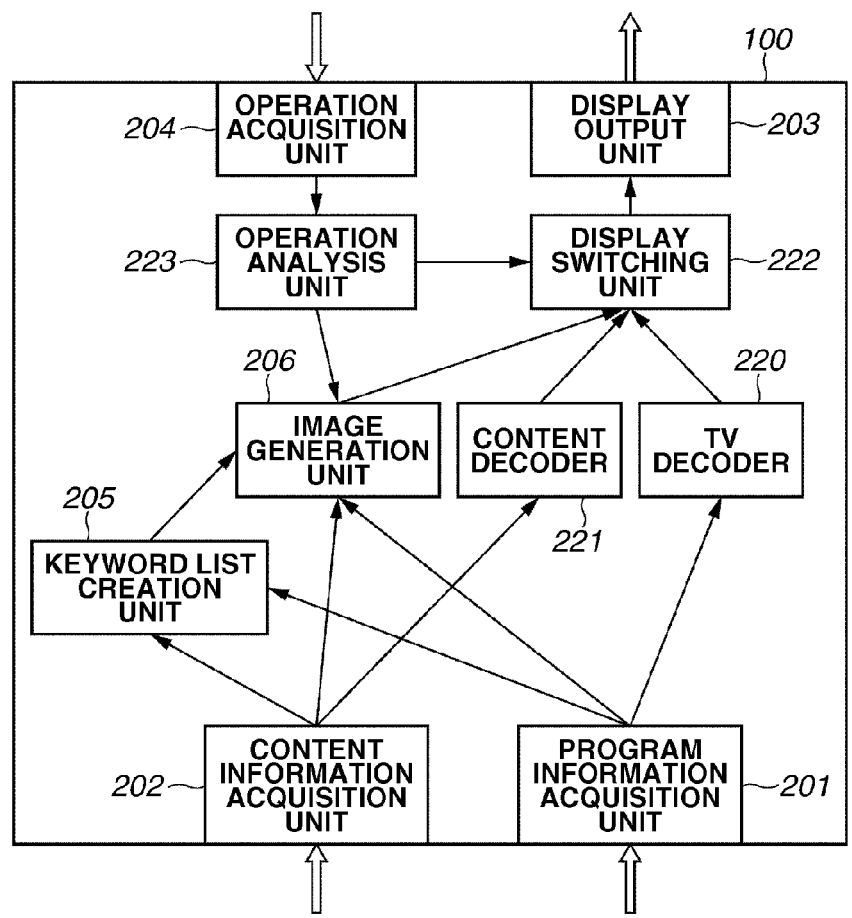
FIG. 3 is a block diagram illustrating an example functional configuration of the program processing device.

Next, an example functional configuration of the program processing device 100 will be described referring to FIG. 3. FIG. 3 is a block diagram illustrating an example functional configuration of a program processing device.

The program processing device 100 includes a program information acquisition unit 201, a content information acquisition unit 202, a display output unit 203, an operation acquisition unit 204, a keyword list creation unit 205, an image generation unit 206, a display switching unit 222, and an operation analysis unit 223. Further, the program processing device 100 includes a TV decoder 220 and a content decoder 221.

A functional configuration as illustrated in FIG. 3 is implemented by the CPU 501 executing a program stored in the memory 502 of the program processing device 100. The functions of a program executed by the CPU 501 include, for example, a data acquisition function, a data storage function, an image processing function, and a rendering processing function. Respective functional configurations can be implemented in various forms by a combination of hardware and software.

The program information acquisition unit 201 acquires videos, audios and program information of broadcast programs via the line 103. The program information acquisition unit 201 can store acquired program information in the memory 502 of the program processing device 100. In addition, the videos and audios of broadcast programs acquired by the program information acquisition unit 201, after being processed by the TV decoder 220, can be output to the display device 101 by the display output unit 203.

The program information refers to information about broadcast programs including, for example, program name information, broadcasting time information, genre information, channel name (broadcasting station name) information, and information about cast members. The genre information refers to information about news, movies, sports, dramas, and so on.

The content information acquisition unit 202 acquires contents and content information accumulated in a storage medium connected to the line 104. The content information acquisition unit 202 can store information on the memory 502 of the program processing device 100. In addition, contents acquired by the content information acquisition unit 202, after being processed by the content decoder 221, can be output to the display device 101 by the display output unit 203.

The content information refers to information regarding contents including, for example, content name information, video time information of contents, genre information, and cast information. When broadcast programs are stored in the contents, content information may include broadcasting channel name (broadcasting station name) information. The genre information refers to information about news, movies, sports, dramas, and so on.

The display output unit 203 outputs broadcast programs, contents and an electronic program guide to the display device 101. The operation acquisition unit 204 acquires various operation instructions that a user has given to broadcast programs, contents and an electronic program guide via the operation input device 102 or the input device 503. The acquired various operation instructions are analyzed by the operation analysis unit 223, and contents of the instructions are transferred to the display switching unit 222 and the image generation unit 206. In addition, operation instructions that the operation acquisition unit 204 acquires can be obtained via either wireless or wired communication.

Figure 4:
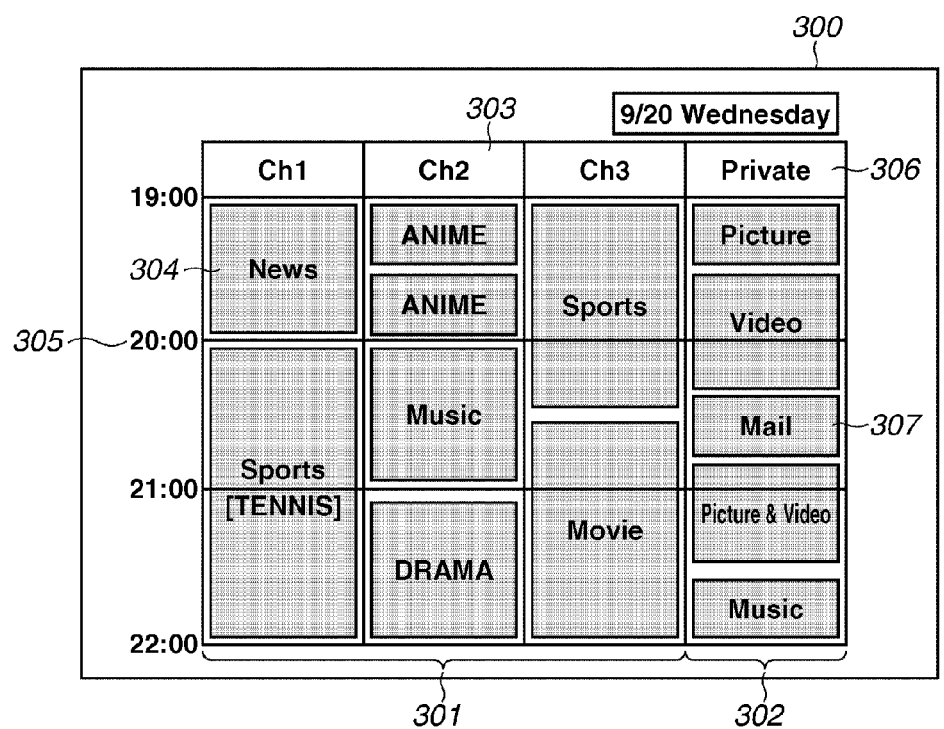
FIG. 4 illustrates an example electronic program guide image.

The image generation unit 206 generates an image of an electronic program guide (electronic program guide image) according to the information acquired by the program information acquisition unit 201 and the content information acquisition unit 202. FIG. 4 illustrates an example electronic program guide image generated by the image generation unit 206, and output via the display output unit 203.

As illustrated in FIG. 4, an electronic program guide image 300 has information about broadcast station channels (program channels) 301 including broadcast station names 303, broadcast hours 305, and program entries (program boxes) 304. In the program channels 301, program entries are arranged vertically in the order of broadcast time for each of a plurality of the broadcast station names 303.

Further, the electronic program guide image 300 has information about a content channel 302 including a content channel name 306, and content entries (content boxes) 307. The content channel 302 contains the content entries arranged vertically in the order of broadcast time. Then, in the electronic program guide image 300 as illustrated in FIG. 4, the program channels 301 and the content channel 302 are arranged parallel with each other.

When the operation acquisition unit 204 acquires an instruction for changing a content entry of a content, the image generation unit 206 generates an electronic program guide image including dynamically changed content entries of the content channel 302 according to the change instruction.

Next, an input device that can perform operation instructions to the program processing device 100 will be described referring to FIG. 5. Here, the operation input device 102 will be described as an example of an input device that allows a user to remotely instruct the program processing device 100.

Figure 5:
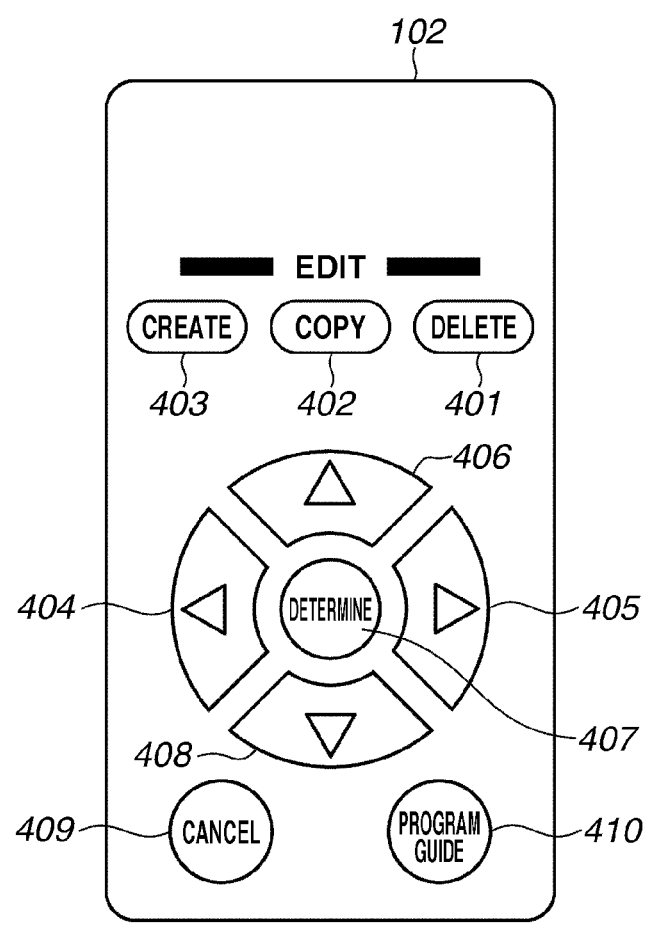
FIG. 5 illustrates an appearance of an example operation input device.

FIG. 5 illustrates an appearance of an example operation input device. The operation input device 102 includes a content channel delete button 401, a content channel copy button 402, and a content channel create button 403. Also, the operation input device 102 includes operation buttons, such as a left button 404, a right button 405, an up button 406, a determine button 407, a down button 408, a cancel button 409, and an electronic program guide display button 410.

When a user presses the left button 404, the right button 405, the up button 406, and the down button 408, a focus (highlight) displayed on the electronic program guide moves left, right, up, and down, respectively. Therefore, the user can make a change instruction for program entries 304 or content entries 307 on the electronic program guide. The focus (highlight) refers to a display on the electronic program guide for identifying a program entry or a content entry that the user has selected to perform a change instruction.

When the operation acquisition unit 204 acquires a change instruction, the image generation unit 206 generates a focus on a program entry or a content entry to which a change instruction are given. The user can instruct to change a focus to any given program entry 304, and can instruct to change a content channel by pressing the determine button 407.

Further, when the user presses an electronic program guide display button 410, the display output unit 203 outputs an electronic program guide generated by the image generation unit 206, on the display device 101. When the user presses the electronic program guide display button 410 again, or presses the cancel button 409 while the display output unit 203 outputs an electronic program guide, then the display output unit 203 stops outputting the electronic program guide.

Returning to FIG. 3, a keyword list creation unit 205 creates a keyword list to be provided to a user when the user changes a content channel. The keyword list creation unit 205 acquires keyword information of keywords to be used for the keyword list from program information and content information. Alternatively, the keyword list creation unit 205 may create keywords using keyword information registered in advance in the program processing device 100 or keyword information added and registered by the user.

The keyword list creation unit 205 assigns priority order to keywords and creates a keyword list. The priority order of the keywords is assigned so that, for example, a keyword that matches program information of focused program entry on the electronic program guide has a higher level priority, or a keyword that matches preliminarily registered information or added registered information by the user has a higher level priority. The image generation unit 206 generates an image, by combining a keyword list created by the keyword list creation unit 205 and the electronic program guide.

Next, the processing to generate an electronic program guide image when changing a content channel will be described referring to a flowchart illustrated in FIG. 6.

In step S10, when a user presses a determine button 407 of the operation input device 102, the operation acquisition unit 204 acquires a change instruction for changing content entry of a content channel. Further, the operation acquisition unit 204 acquires a program entry 304 focused (selected) on the electronic program guide.

In step S11, the keyword list creation unit 205 extracts keywords from program information of focused program entry 304. The program information extracted as keywords is the one that has been acquired by the program information acquisition unit 201, and has been stored on a memory 502.

The keyword list creation unit 205 may extract registered information that has been registered in advance as keywords, or extract content information of contents that has been stored in a storage medium as keywords. Here, when content information is extracted as keywords, extracted content information is the one that has been acquired by the content information acquisition unit 202, and stored on the memory 502.

In step S12, the keyword list creation unit 205 assigns priority order to extracted keywords, and creates a keyword list. The keyword list creation unit 205 arranges keywords in the keyword list such that keywords with high priority order are positioned higher than keywords with lower priority.

In step S13, the image generation unit 206 generates an image formed by combining a keyword list that the keyword list creation unit 205 has created and an electronic program guide. The image formed by combining the keyword list and the electronic program guide generated by the image generation unit 206 is output to a screen of the display device 101 via the display output unit 203.

Now, referring to FIGS. 7A and 7B that illustrate an example of transition of an electronic program guide image, an example screen will be described. An image formed by combining a keyword list and an electronic program guide is displayed thereon.

Figure 7A:
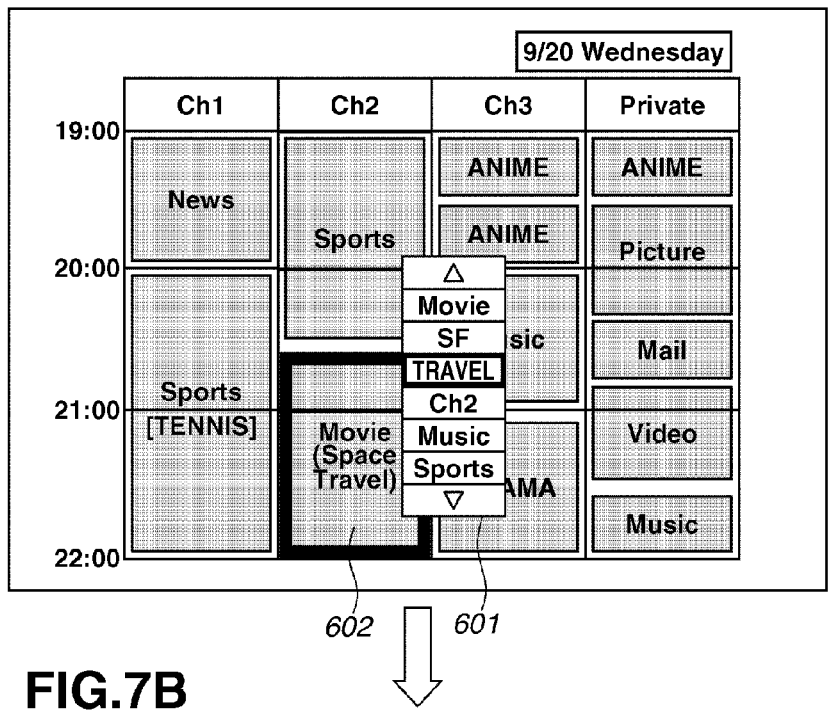
FIGS. 7A and 7B and FIGS. 8A and 8B illustrate examples of transitions of an electronic program guide image.

FIG. 7A illustrates an example screen on which an image formed by combining a keyword list and an electronic program guide is displayed. In FIG. 7A, a focus is illustrated by surrounding a program entry or a content entry with a bold box. The focus can be changed in any style as long as it can be distinguished as a selected program entry. For example, changing the color of selected program entry or content entry can be used.

In the electronic program guide as illustrated in FIG. 7A, the operation acquisition unit 204 acquires a program entry "Movie (Space Travel)" 602 registered in a focused broadcast station name "Ch 2." The keyword list creation unit 205 extracts keywords, such as "Movie," "SF," "Travel," "Ch 2" based on the program information of the program entry 602 currently being focused, from a category relating to the program entry, words used in the program information, broadcast station names, and creates a keyword list 601 in a one-dimensional array.

Further, the image generation unit 206 generates an image formed by combining the keyword list 601 at a position adjacent to the focused program entry 602, as illustrated in FIG. 7A. Here, the image is generated so that the keyword list 601 is arranged to be adjacent to the program entry 602. However, the keyword list 601 can be arranged at any position as long as it is arranged near the program entry 602. Here, the word "near" includes cases in which the keyword list 601 is arranged to overlap a program box of a program entry, the keyword list 601 is arranged adjacent to upper, lower, left, or right side of the program box of the program entry, and the keyword list 601 is arranged adjacent to upper-left, lower-left, upper-right, or lower-right corner of the program box of the program entry.

In step S14, the operation acquisition unit 204 acquires keywords that a user has instructed to select via the operation input device 102 from a keyword list displayed on a screen of the display device 101.

In step S15, the content information acquisition unit 202 acquires content information relating to the keywords based on the keywords that the operation acquisition unit 204 has acquired.

In step S16, the image generation unit 206 changes content entries, based on the content information that the content information acquisition unit 202 has acquired in step S15, and generates an image of a new content channel. Further, the image generation unit 206 generates a new electronic program guide image using a newly generated image of content channel.

In step S17, the display output unit 203 outputs an electronic program guide image that the image generation unit 206 has generated in step S16 to the display device 101.

Figure 7B:
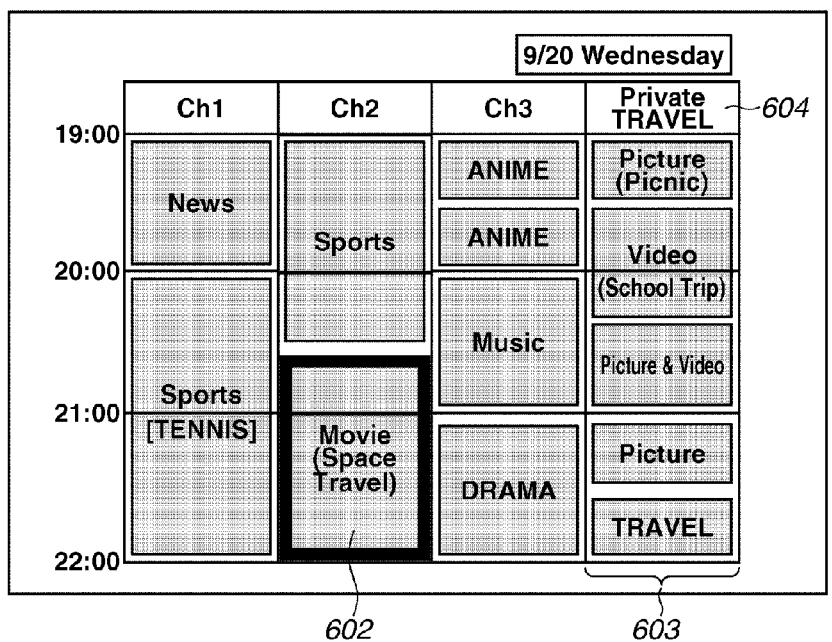

Here, FIG. 7B illustrates an example image of an electronic program guide generated, using an image of a newly generated content channel, from an electronic program guide as illustrated in FIG. 7A. In FIG. 7B, a user has instructed to select a keyword of "Travel" in the keyword list 601 generated in FIG. 7A.

As illustrated in FIG. 7B, the image generation unit 206 generates a content channel 603 in which "Picture (Picnic)," "Video (School Trip)," and others are included as new content entries, of which content information is "TRAVEL," out of the content entries. The image generation unit 206 generates an electronic program guide image with a keyword "Travel"

added to a content channel name 604 as a channel identifier, as illustrated in FIG. 7B. The keyword "Travel" was used when a content channel has been changed.

Thus, according to the present exemplary embodiment, the program processing device can dynamically change content entries of a content channel on an electronic program guide according to a user's preference.

Further, when a user changes content entries of a content channel, the user can instruct to select keywords from the keyword list created by the program processing device, and can change the content channel to the content channel in which the content entries relating to the keywords that the user has selected are included. Therefore, the user can change the content channel to the content channel that the user intends to view in a simple manner. Further, the user can register keywords displayed in the keyword list, and can assign priority order to the keywords. Consequently, the user can obtain the content channel that further reflects the user's preference.

When keywords are determined only by focusing a program entry, such as when there is a keyword corresponding to the focused program entry, or when only a category of the program entry is used as keywords, the content channel can be changed in response to an operation for focusing a program entry.

As described above, only the case, in which the keyword list creation unit 205 creates the keyword list arranged vertically in one-dimension, is described, but it is not limited to this case. For example, the keyword list creation unit 205 can arrange the keyword list in one-dimension from left-to-right direction of the display screen. Further, the keyword list creation unit 205 can arrange the keyword list in two-dimensional matrix. The keyword list creation unit 205 can simply arrange the keyword list to display only one keyword at a time to display keywords one by one.

Further, the operation acquisition unit 204 acquires (operation acquisition) operation information of a content channel copy button 402 of the operation input device 102 by the user. Thereby the image generation unit 206 generates an image in which the changed content channel is copied on the electronic program guide. The operation acquisition unit 204 acquires operation information of a content channel delete button 401 of the operation input device 102 by the user. Thereby the image generation unit 206 generates an image in which the content channel has been deleted from the electronic program guide.

When the content channel is not present on the electronic program guide, the operation acquisition unit 204 acquires operation information of a content channel create button 403 of the operation input device 102 by the user. Thereby the image generation unit 206 generates the content channel. In this case, the operation processing to generate the electronic program guide image is similar to the above-described flowchart as illustrated in FIG. 6.

Figure 8A:
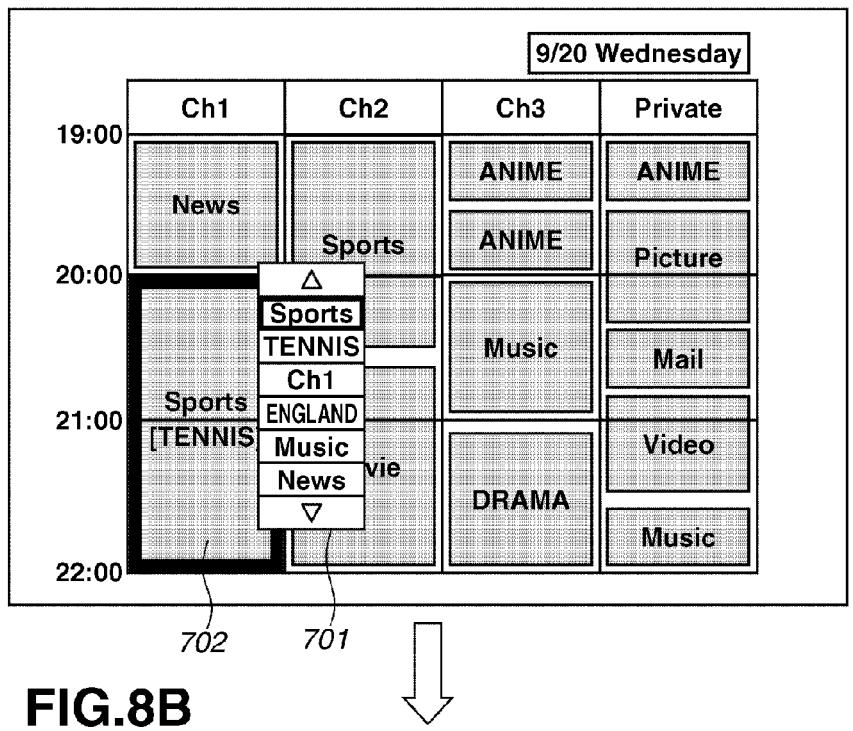
Figure 8B:
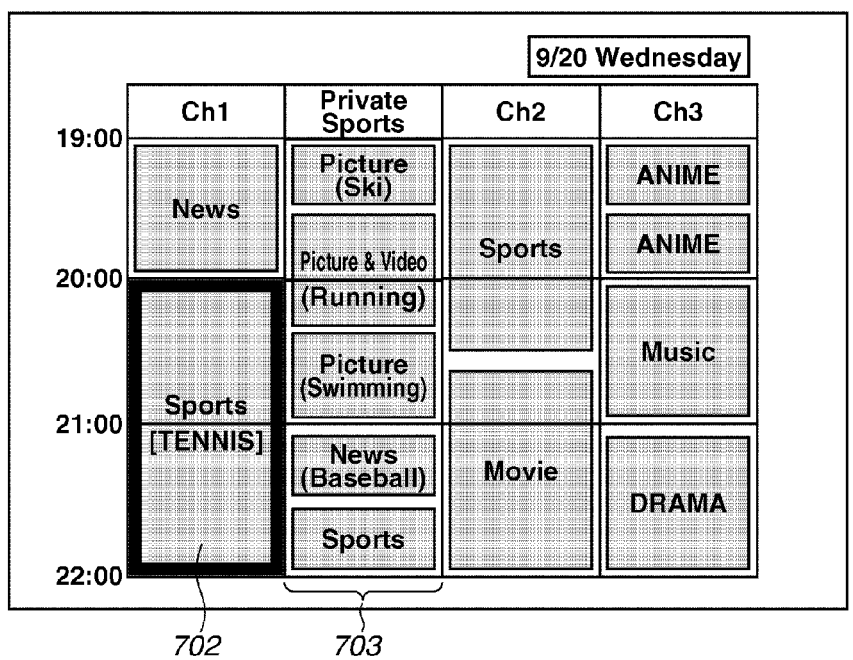

The processing in which a program processing device according to a second exemplary embodiment generates an electronic program image will be described with reference to FIGS. 8A and 8B. FIGS. 8A and 8B illustrate an example transition of an electronic program guide image.

The image generation unit 206 of the program processing device 100 according to the first exemplary embodiment, when changing a content channel and generating an electronic program guide image, changes the content entries of the content channel to generate the electronic program guide image. An image generation unit 206 according to the present exemplary embodiment changes an arrangement of the content channel on the electronic program guide in addition to changing of the content entries. In the present exemplary embodiment, a change instruction for changing the content entries of the content channel is accompanied by a change instruction for changing an arrangement of the content channel.

FIG. 8A illustrates an example screen on which an image formed by combining a keyword list and an electronic program guide is displayed. In an electronic program guide as illustrated in FIG. 8A, the operation acquisition unit 204 acquires a program entry "Sports (Tennis)" 702 of the focused broadcast station name 'Ch 1.'

The keyword list creation unit 205 extracts keywords, such as "Sports," "Tennis," "Ch 1," "England," based on program information of a focused program entry 702, and creates a keyword list 701. Further, the image generation unit 206 generates an image formed by combining the keyword list 701 at a position adjacent to the focused program entry 702, as illustrated in FIG. 8A.

FIG. 8B illustrates an example image of the electronic program guide generated using a newly generated image of content channels from the electronic program guide as illustrated in FIG. 8A. In FIG. 8B, a user has instructed to select a keyword of "Sports" in the keyword list 701 generated in FIG. 8A.

As illustrated in FIG. 8B, the image generation unit 206 generates a content channel 703 in which "Picture (Ski)," "Picture & Video (Running)," and others are arranged as new content entries using 'Sports' as content information. In this case, the image generation unit 206 arranges the position of the generated content channel 703 parallel with and adjacent to a program channel containing a program entry 702 that is focused by a user.

Thus, according to the present exemplary embodiment, the program processing device arranges a changed content channel parallel with and adjacent to a program channel containing a program entry that is focused by the user. Therefore, the user can easily find the content channel.

It is noted that it is not limited to the case where the content channel is arranged parallel with and adjacent to a program channel containing a program entry that is focused by a user, and the content channel can be arranged at any position as long as it is arranged near the program entry that is focused. Here, the word "near" means the case where the content channel is arranged adjacent to the left or right side of the program channel, or arranged with one of other program channels being intervened therebetween.

In the exemplary embodiment, only the case is described where a change instruction of content entries of a content channel is accompanied by a change instruction of an arrangement of the content channel, but only a change instruction of the arrangement of the content channel can be performed. In this case, the image generation unit arranges a position of the content channel, for example, parallel with and adjacent to a program channel containing a focused program entry.

According to the exemplary embodiment described above, a content channel according to a user's preference can be generated by enabling the content channel to be dynamically changed. It is to be noted that the present invention is also implemented by a CPU that reads out program code of software for realizing the functions of the above-described exemplary embodiments from a computer-readable storage medium and executes them. Further, the invention is also implemented by an operating system (OS) or the like that performs a part of or the whole of the processes according to instructions of the read out program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-145144 filed Jun. 2, 2008, which is hereby incorporated by reference herein in its entirety.

What is claimed is:

1. A method for displaying an electronic program guide, the method comprising:
    displaying an electronic program guide where a plurality of program channels each including program entries of programs to be broadcast are arranged in respective columns and a content channel including at least one content entry extracted from content entries of contents recorded in a recording device is arranged in a column parallel to the respective columns of the plurality of program channels;
    accepting a designation of a program entry by a user from the program entries in the displayed program channels;
    in response to the designation of the program entry, extracting a plurality of keywords from program information of the designated program entry, and displaying a keyword list of the plurality of extracted keywords in the vicinity of the designated program entry on the electronic program guide;
    accepting a designation of a keyword by a user from the displayed keyword list;
    in response to the designation of the keyword, extracting content entries relating to the designated keyword from the content entries of the contents recorded in the recording device, and dynamically changing the content entries in the displayed content channel to the extracted content entries related to the designated keyword; and
    rearranging the columns of the plurality of program channels and the content channel such that the column of the content channel is placed adjacent to the column of the program channel including the designated entry.

2. The method according to claim 1, further comprising:
    adding the selected keyword to the changed content channel in the displayed electronic program guide as a name of the changed content channel.

3. A non-transitory computer-readable storage medium that stores a program for instructing a computer to implement a method for displaying an electronic program guide, the method comprising:
    displaying an electronic program guide where a plurality of program channels each including program entries of programs to be broadcast are arranged in respective columns and a content channel including at least one content entry extracted from content entries of contents recorded in a recording device is arranged in a column parallel to the respective columns of the plurality of program channels;
    accepting a designation of a program entry by a user from the program entries in the displayed program channels;
    in response to the designation of the program entry, extracting a plurality of keywords from program information of the designated program entry, and displaying a keyword list of the plurality of extracted keywords in the vicinity of the designated program entry on the electronic program guide;
    accepting a designation of a keyword by a user from the displayed keyword list;
    in response to the designation of the keyword, extracting content entries relating to the designated keyword from the content entries of the contents recorded in the recording device, and dynamically changing the content entries in the displayed content channel to the extracted content entries related to the designated keyword; and
    rearranging the columns of the plurality of program channels and the content channel such that the column of the content channel is placed adjacent to the column of the program channel including the designated entry.

4. A device for displaying an electronic program guide, the device comprising:
    memory; and
    at least one processor, the at least one processor configured to:
    display an electronic program guide in which a plurality of program channels each including program entries of programs to be broadcast are arranged in respective columns and a content channel including at least one content entry extracted from content entries of contents recorded in a recording device is arranged in a column parallel to the respective columns of the plurality of program channels;
    accept a designation of a program entry by a user from the program entries in the displayed program channels;
    in response to the designation of the program entry, extract a plurality of keywords from program information of the designated program entry, and display a keyword list of the plurality of extracted keywords in the vicinity of the designated program entry on the electronic program guide;
    accept a designation of a keyword by a user from the displayed keyword list;
    in response to the designation of the keyword, extract content entries relating to the designated keyword from the content entries of the contents recorded in the recording device, and dynamically change the content entries in the displayed content channel to the extracted content entries related to the designated keyword; and
    rearrange the columns of the plurality of program channels and the content channel such that the column of the content channel is placed adjacent to the column of the program channel including the designated entry.

* * * * *